Dec. 18, 1934.   C. B. BAGGS   1,985,071
WINDSCREEN WIPER FOR AUTOMOBILES AND THE LIKE
Filed Feb. 20, 1934
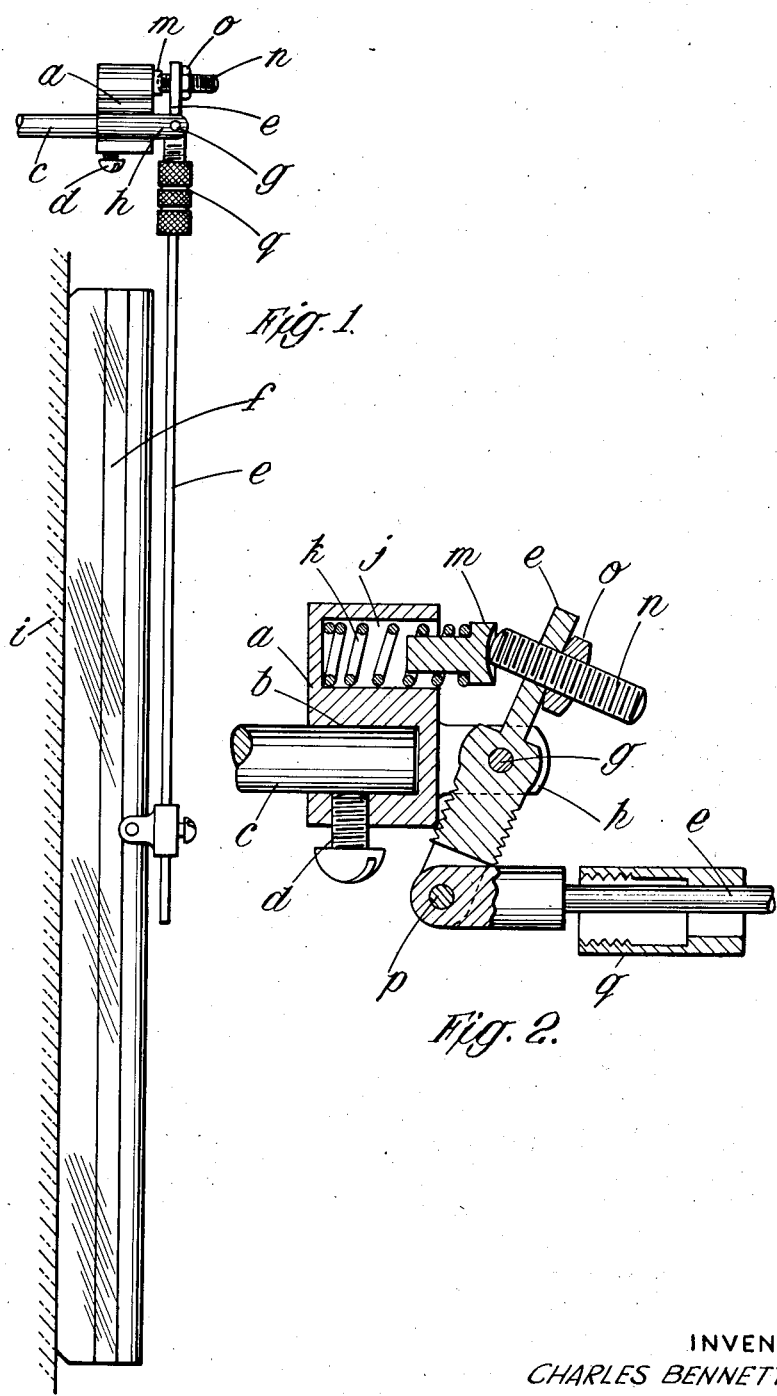
INVENTOR
CHARLES BENNETT BAGGS
BY
ATTORNEYS Patented Dec. 18, 1934

1,985,071

UNITED STATES PATENT OFFICE 1,985,071

WINDSCREEN WIPER FOR AUTOMOBILES AND THE LIKE

Charles Bennett Baggs, London, England, assignor to Romac Motor Accessories Limited, London, England Application February 20, 1934, Serial No. 712,113
In Great Britain September 14, 1933

4 Claims. (Cl. 15—255)

This invention relates to an arm for a windscreen wiper for an automobile or the like, by which the wiper blade is forced resiliently against the surface of the windscreen and has for its objects to provide an arm which may be attached readily to an existing wiper, which has improved means for exerting the required resilient pressure, and for adjusting that pressure, at will, and improved means for enabling said arm and the wiper blade carried thereby to be moved away in a direction normal to the plane of the windscreen when it is desired to clean the latter.

According to the present invention the first of these objects is attained by a body apertured to receive the front end of the usual spindle of the wiper mechanism and having means, such as a set screw, whereby said body may be clamped to said spindle, the blade-carrying arm being pivoted intermediately of its length to said body on an axis, which, when the arm is in position, is parallel to the plane of the windscreen, one limb of said arm being spring influenced relatively to said body.

The second object is attained by the provision of a spring which may influence a plunger, which may be housed in a suitable recess in said body and bear against the shorter upper limb of the blade-carrying arm, e. g. through the medium of a set screw by which the action of the spring may be adjusted. If desired, however, the spring may be a tension spring and may be housed in a suitably formed part of the blade-carrying arm.

Lastly, in order to allow the arm and the blade carried thereby to be moved away in a direction normal to the plane of the windscreen in order that the latter may be cleaned, the longer limb of said arm may be suitably jointed and provided with means for holding said joint rigid under normal circumstances and for permitting it to flex only when required. For example, a sleeve may be arranged to slide along the arm and to be secured over the joint by screwing it to part of said body or by connecting it therewith by a bayonet, friction or like joint, so that whilst, normally, the arm is rigid, the sleeve may be loosened and slid clear of the joint to enable the arm to be flexed so that it, and the wiper blade carried thereby, may be moved clear of the windscreen.

One form of the invention is illustrated in the accompanying drawing whereof Figure 1 is a side elevation showing the blade-carrying arm in its operative position with the blade bearing against a windscreen and Figure 2 is a fragmentary sectional elevation on an enlarged scale showing the blade carrying arm flexed.

As shown a body $a$ is apertured as at $b$ to receive the front end of the usual spindle $c$ (only a part of which is shown) of the wiper mechanism (not shown) and is provided with a set screw $d$ whereby the body $a$ may be clamped to the spindle $c$. The arm $e$ for carrying the usual blade $f$ is pivoted at $g$ intermediately of its length between a pair of lugs such as $h$ on the body $a$ on an axis, which, when the arm is in position, is parallel to the plane of the windscreen $i$.

Housed in a recess $j$ in the body $a$ is a coiled spring $k$ abutting at the one end against the bottom of the recess $j$ and at the other end against a shouldered plunger $m$ adapted to slide in said recess $j$. This plunger $m$ bears against a screw $n$ provided with a lock nut $o$ and threaded through the shorter upper limb of the blade-carrying arm $e$ and by which the action of the spring $k$ may be adjusted.

The longer limb of the blade-carrying arm $e$ is jointed as at $p$ Figure 2 in order that the limb and the blade $f$ may be moved away from the windscreen $i$ in a direction normal to the plane of the latter to allow the windscreen to be cleaned, and in order to hold the joint $p$ rigid under normal circumstances and permit it to flex when required, an interiorly threaded sleeve $q$ is adapted to screw on to that part of the arm $e$ between the joint $p$ and the pivot $g$ and to slide along that part of the arm $e$ beyond the joint $p$.

In Figure 1 the sleeve $q$ is shown in position to maintain the joint $p$ rigid and in Figure 2 it is shown clear of said joint and the arm $e$ is shown flexed.

The means for attaching the improved arm to a wiper mechanism are very simple, the adjusting means permit the pressure of the blade to be varied to suit requirements and the sleeve-covered joint permits the arm and blade readily to be moved clear without impairing the rigidity of the arm when in use.

I claim:—

1. An improved blade carrying arm for a windshield wiper of the class described, a body member adapted to fit the exposed end of the wiper mechanism spindle, means to clamp said body member to said spindle, and pivot means on said body member for receiving said arm, said body member having a spring receiving means, and a spring between said spring receiving means on said body member and the arm whereby the wiper blade carrying end of the arm is resiliently held adjacent the windshield, said spring receiving means including a housing on said body member, a plunger moved by the spring member, and an adjustable screw member engaging said plunger and extending through the arm.

2. An improved blade carrying arm for a windshield wiper for automobiles and the like provided with a body member apertured to receive the front end of the usual oscillatory spindle of the wiper mechanism and means to clamp the body member to said spindle, said arm being pivoted intermediate its length to said body member on an axis which when the arm is in position is parallel to the plane of the windshield, spring means influencing one limb of the arm whereby a blade on said arm will be resiliently forced into contact with the windshield, and means to adjust the tension of said spring means, said blade carrying arm being pivotally jointed to flex about an axis substantially parallel to the plane of the windshield at a point between the pivot of said arm and the wiper blade carrying end of the arm, a sleeve slidable along the arm and means to retain said sleeve over the joint to hold the joint rigid, said sleeve being removable from the joint whereby the wiper blade carrying end of the arm may be freely moved away from the windshield.

3. An improved blade carrying arm for a windshield wiper for automobiles and the like which is provided with a body apertured to receive the front end of the usual spindle of the wiper mechanism, and means to clamp the body portion to the spindle, said arm being pivoted to the said body, one part of said arm being spring influenced relative to said body, said arm being pivotally jointed to flex about an axis substantially parallel to the plane of the windshield at a point between the pivot of said arm and the wiper blade carrying end of the arm and means to hold said joint normally rigid, said means including a sleeve carried by part of the arm, and means to retain said sleeve over said joint whereby the wiper blade carrying end of the arm is movable to a substantially right angle position with respect to the windshield when said sleeve is removed from said joint.

4. An improved blade carrying arm for a windshield wiper for automobiles and the like provided with means to secure said arm to the front end of the wiper blade operating mechanism, said arm being pivotally jointed to flex about an axis substantially parallel to the plane of the windshield at a point between the end of the wiper blade operating mechanism and wiper blade carrying end of the arm, and a sleeve on one limb of the arm, said sleeve engaging the other limb of the arm to hold the joint rigid, said sleeve being releasable from said joint whereby the wiper blade carrying end of said arm may be freely moved away from the windshield.

CHARLES BENNETT BAGGS.